United States Patent Office 2,712,551
Patented July 5, 1955

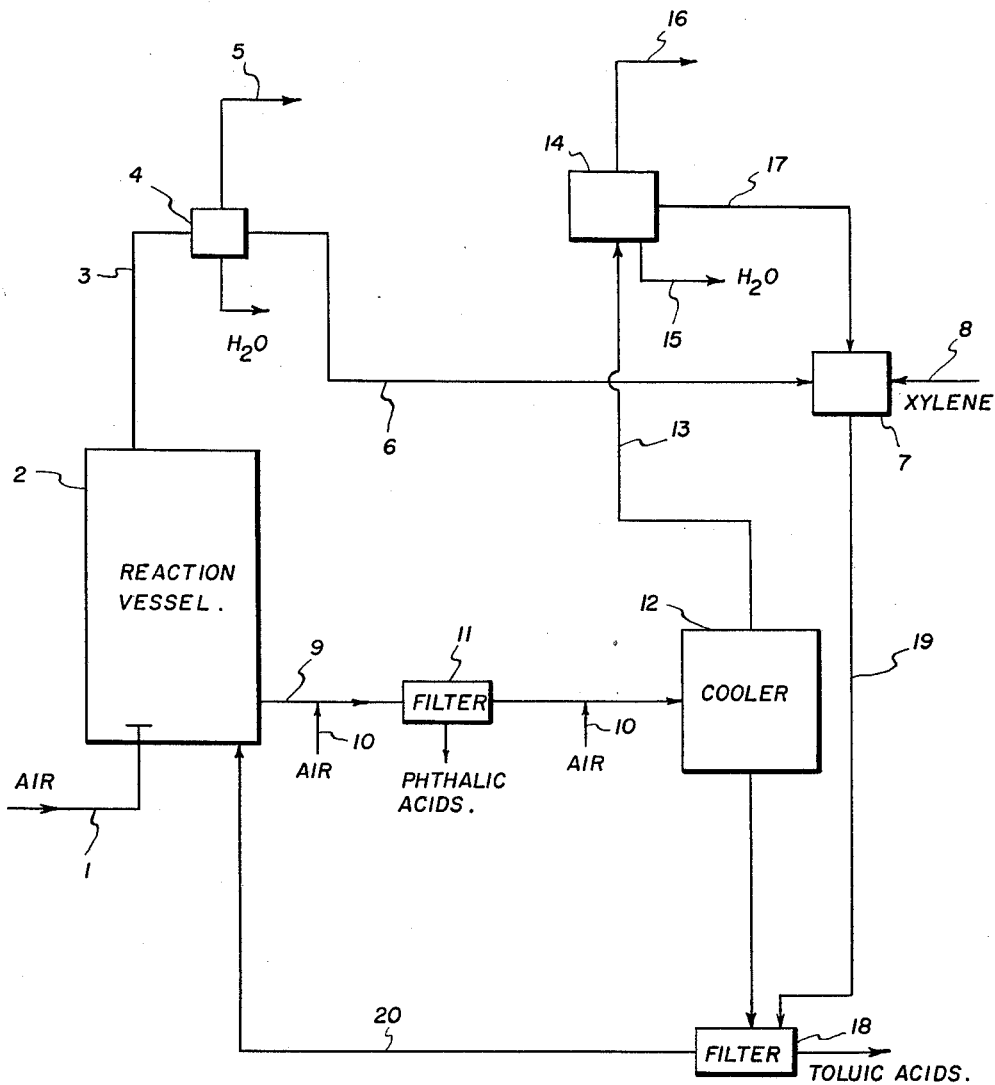

2,712,551

PROCESS OF PREPARING TOLUIC ACIDS

Chester M. Himel, Menlo Park, and Lester P. Berriman, Palo Alto, Calif., assignors to Richfield Oil Corporation, Los Angeles, Calif., a corporation of Delaware Application May 18, 1954, Serial No. 430,748

5 Claims. (Cl. 260—524)

This invention relates to improvements in the manufacture of toluic acids by the liquid phase oxidation of the corresponding xylenes in the presence of a catalyst through utilization of an oxygen-rich gas as the oxidizing medium. More particularly, our invention is concerned with a method of separating the toluic acids produced from this reaction procedure and returning the catalyst to the oxidation reaction dissolved in unreacted xylenes.

It is known to prepare toluic acids by oxidizing xylenes in the liquid phase using as a catalyst a cobalt, manganese or cerium salt which is soluble in the reaction mixture. The oxidation is carried out under elevated conditions of temperature and pressure in the presence of air or other oxygen-rich gas used as the oxidizing medium. The individual xylene isomers or mixtures thereof can be used as a starting material.

It has been proposed to separate toluic acids from the reaction mixture of the air oxidation of xylenes by transforming the catalyst to an insoluble state and then filtering it from the reaction mixture. The reaction product is distilled to separate the desired toluic acids from unreacted xylenes. Under some conditions this operation is not desirable since it involves the relatively costly distillation step. Our present invention provides a means for separating the toluic acids produced by this reaction not necessitating the performance of this distillation operation.

We have now found that toluic acids can be separated from the reaction product from the liquid phase air oxidation of the xylenes by taking a stream of the reaction mixture from its vessel and passing it in contact with a free oxygen-containing gas to a cooling zone. In this zone the product is rapidly cooled to a temperature below 100° C. The product is then filtered at a temperature of about 40° to 75° C. to separate precipitated toluic acids. The filtrate comprising unreacted xylenes and catalyst is then recycled to the oxidation reaction. Thus through this procedure the toluic acids produced can be separated from the catalyst and unreacted xylenes in the filtrate without converting the catalyst to an insoluble form and without distilling the toluic acids as an overhead product to separate them from unreacted xylenes. Also the catalyst and xylenes are recovered in convenient form to be recycled to the principal reaction zone.

The oxidation of the xylenes is effected in the liquid phase at elevated temperatures and pressures in the presence of a soluble cobalt, manganese or cerium salt catalyst and air or other oxygen-containing gas. Generally, the reaction temperature will range from about 130° to 250° C., preferably 150° to 190° C., while the operating pressure will vary from about 50 to 500 p. s. i. g., preferably 100 to 250 p. s. i. g., and the pressure is sufficient to maintain the reaction in the liquid phase. Details concerning the oxidation of xylenes to toluic acids are set forth in Chester M. Himel's application Serial No. 296,718, filed July 1, 1952, now Pat. No. 2,696,499. In passing a stream of the reaction mixture from the reaction vessel to the cooling zone the catalyst must not be precipitated. Thus we maintain the stream in contact with an oxygen-containing gas while it is being carried to the cooling zone. In this zone the reaction stream must be cooled rapidly to below about 100° C. to avoid converting appreciable quantities of the catalyst to insoluble form since it is not feasible to keep the stream in contact with sufficient oxygen-containing gas during slow cooling to avoid conversion and precipitation of the catalyst. The rapid cooling can most advantageously be effected by flashing the reaction mixture at a pressure not exceeding about atmospheric without precipitating the catalyst.

The reaction mixture from the cooling zone is then filtered at a temperature of about 40° to 75° C., and the toluic acids are separated as a solid product. If any phthalic acids are produced during the oxidation reaction, they will be precipitated along with the toluic acids, but the latter do not decrease the value of the toluic acids in situations where the toluic acids are to be oxidized to phthalic acids. The filtrate includes unreacted xylenes having dissolved therein the oxidation catalyst. The catalyst is returned to the reaction zone in the recycled filtrate.

If it be desirable to obtain the toluic acids uncontaminated with phthalic acids, our process can be varied to produce this result. In this variation a filter is placed in the line conveying the reaction mixture from the oxidation vessel to the cooling zone. By filtering the stream at a temperature of about 130° to 160° C. in the presence of an oxygen-containing gas, the catalyst and toluic acids present remain dissolved and the phthalic acids are removed as a solid. Since the phthalic acids are separated from the reaction mixture, they will not separate as solids along with toluic acids in the filtration step after the rapid cooling step, and thus the toluic acids produced are uncontaminated with phthalic acids. Where oxidation temperatures above 160° C. are employed, the reaction mixture passing to the filter which removes the phthalic acids must be cooled as in a heat exchanger so that at the time of filtration the temperature of the mixture will not be above about 160° C.

This invention will be described in further detail with reference to the accompanying drawing showing by a flow sheet a method of effecting our process.

*Example I*

In reaction vessel 2 there is maintained unreacted paraxylene, a pressure of 200 p. s. i. g. and a liquid level of reaction mixture having a temperature of 150° to 155° C. The reacting mixture contains about 0.5 weight per cent of cobalt toluate. Air at the rate of 500 cubic feet per hour (measure at 60° F. and one atmosphere) is charged through line 1. Off-gases from the reaction are removed by means of line 3 into condenser 4. Condensed paraxylene is separated from the water and removed through line 6 to the xylene charge tank 7. Off-gases are vented through line 5. Water is taken from the bottom of condenser 4. Oxidation products at a rate of 620 lbs./hr. are pumped through line 9 in which air is injected through line 10 to maintain a concentration of oxygen during the filtration which occurs in continuous filter 11 which removes phthalic acids. The effluent liquid from the filter is then flashed in cooler tank 12 maintained at 2 p. s. i. a. Vapors from the cooler are conveyed by line 13 and condensed in condenser 14, and separated paraxylene is returned by way of line 17 to tank 7. Water is removed from condenser 14 by line 15 while off-gases pass through line 16. The crystallized toluic acids in tank 12 at 70°

C. are filtered continuously in filter 18 and washed with 20 pounds per hour of make-up paraxylene from tank 7 by way of line 19. The total liquid effluent stream containing catalyst at a temperature of 38° C. from filter 18 is pumped back into the reactor 2 by way of line 20 to maintain the temperature of the reaction mixture at 150° to 155° C. Filtered and washed paratoluic acids in an amount of about 25 pounds per hour are discharged from filter 18. Paraxylene is supplied to make-up tank 7 by way of line 8.

*Example II*

The process of Example I is carried out except that filter 11 is removed from line 9. In this case the phthalic acid is isolated with the toluic acid from filter 18. This product is suitable for subsequent conversion to phthalic acid by $HNO_3$ oxidation.

*Example III*

Commercial meta-paraxylene is crystallized in a conventional batch apparatus to give the first crystalline fraction which is recovered by filtration. This fraction has the following analysis: paraxylene 70%, meta-xylene 25%, orthoxylene 3%, ethylbenzene 2%, and is used without further purification. This feedstock is charged to the process of Example I and the crystalline toluic acid product recovered containing orthotoluic acid and benzoic acid. The product can be used as such or charged to a topping still to remove a mixture of benzoic acid, orthotoluic acid and a minor amount of metatoluic acid, overhead. The residue product is 99.5% meta-paratoluic acids (76% para-, 23.5% meta-).

We claim:

1. In the preparation of toluic acids by oxidizing the corresponding xylenes, the steps of introducing xylenes and an oxygen-containing gas into a reaction vessel wherein xylenes are oxidized in the liquid phase maintained under elevated conditions of temperature and pressure and containing as a catalyst a salt which is soluble in the reaction mixture and which is selected from the group consisting of cobalt salts, manganese salts and cerium salts, withdrawing from the reaction vessel a stream of the reaction mixture and passing it to a cooling zone while in contact with a free oxygen-containing gas to maintain the catalyst in a soluble form, cooling rapidly the temperature of the stream to below about 100° C., filtering the cooled materials at a temperature of about 40° to 70° C. to separate the toluic acids as solids, and recycling the oxidation catalyst in the filtrate to the reaction zone.

2. The method of claim 1 in which the xylene feed is paraxylene.

3. The method of claim 1 in which the catalyst is a cobalt salt.

4. The method of claim 1 in which the rapid cooling of the stream to below about 100° C. is effected by flashing the stream at a pressure not exceeding about atmospheric.

5. In the preparation of toluic acids by oxidizing corresponding xylenes, the steps of introducing xylenes and an oxygen-containing gas into a reaction vessel wherein xylenes are oxidized in the liquid phase maintained under elevated conditions of temperature and pressure and containing as a catalyst a salt which is soluble in the reaction mixture and which is selected from the group consisting of cobalt salts, manganese salts and cerium salts, and in which the severity of the oxidation conditions is such that phthalic acid is formed in addition to toluic acid, withdrawing from the reaction vessel a stream of the reaction mixture, filtering the stream in the presence of an oxygen-containing gas and at a temperature from about 130° to 160° C. whereby the catalyst and toluic acid remain soluble in the stream and precipitated phthalic acid is removed, passing the filtrate to a cooling zone while in contact with a free oxygen-containing gas to maintain the catalyst in a soluble form, cooling rapidly the temperature of the filtrate to below about 100° C., filtering the cooled materials at a temperature of about 40° to 70° C. to separate the toluic acid as a solid, and recycling the oxidation catalyst in the filtrate to the reaction zone.

No references cited.